(12) United States Patent
Sturm (10) Patent No.: US 7,494,056 B2
(45) Date of Patent: Feb. 24, 2009

(54) RETAIL PACKAGE FOR PREPAID DEBIT CARDS AND METHOD FOR DEBIT CARD DISTRIBUTION

(76) Inventor: Kenneth Sturm, 5676-78 Riverdale Ave., Suite 103, Riverdale, NY (US) 10471

(*) Notice: Subject to any disclaimer, the term of this patent is extended or adjusted under 35 U.S.C. 154(b) by 607 days.

(21) Appl. No.: 11/209,507

(22) Filed: Aug. 23, 2005

(65) Prior Publication Data

US 2007/0045401 A1 Mar. 1, 2007

(51) Int. Cl.
*G06K 5/00* (2006.01)

(52) U.S. Cl. ........................ 235/380; 235/382
(58) Field of Classification Search ................ 235/380, 235/383, 492, 493, 486, 487, 449, 375, 382, 235/382.5
See application file for complete search history.

(56) References Cited

U.S. PATENT DOCUMENTS

| | | | | |
|---|---|---|---|---|
| 5,842,629 A | * | 12/1998 | Sprague et al. | 229/71 |
| 6,457,649 B1 | * | 10/2002 | Hileman | 235/486 |
| 2002/0088851 A1 | * | 7/2002 | Hodes | 235/380 |
| 2002/0091573 A1 | * | 7/2002 | Hodes | 705/17 |
| 2002/0157974 A1 | * | 10/2002 | Krahn | 206/308.1 |
| 2003/0018586 A1 | * | 1/2003 | Krahn | 705/58 |
| 2003/0150762 A1 | * | 8/2003 | Biller | 206/461 |
| 2007/0251995 A1 | * | 11/2007 | Kingsborough et al. | 235/380 |

* cited by examiner

*Primary Examiner*—Thien M Le
(74) *Attorney, Agent, or Firm*—Scott D. Wofsy; Edwards Angell Palmer & Dodge LLP (57) ABSTRACT

A retail package for prepaid cards is disclosed which includes a card retainer, a proxy debit card retained by the retainer and adapted to be loaded with funds at a point of sale, and at least one electronic debit card retained by the retainer and requiring registration prior to use, wherein the proxy debit card and the at least one electronic debit card are linked to one another within a processing system to facilitate fund transfers therebetween after registration of the at least one debit card. Methods of distributing prepaid cards are also disclosed.

32 Claims, 9 Drawing Sheets

RETAIL PACKAGE FOR PREPAID DEBIT CARDS AND METHOD FOR DEBIT CARD DISTRIBUTION

BACKGROUND OF THE INVENTION

1. Field of the Invention

The subject invention is directed to retail packaging, and more particularly, to a retail package for selling prepaid debit cards and to methods for distributing and loading funds onto prepaid debit cards.

2. Background of the Related Art

Over the past ten years, consumers in the United States have seen the emergence of a new electronic transaction medium in the form of stored value cards or gift cards. Each month, hundreds of millions of dollars worth of transactions are generated at various retailer points of sale around the United States using these cards. During the most recent holiday shopping season, it is estimated that $17 Billion dollars or 8% of the entire holiday season expenditure was in the stored value category.

Approximately five years ago, the Bankcard Association (Visa and MasterCard) began to consider retail sales of branded bankcard products that could be sold at retail locations in connection with a simple J-hook package. The initial thoughts behind these products were to provide a more powerful type of universal gift card. These pre-denominated cards would be activated at the point of sale in amounts of $25/$50/$100 or more across a merchant's existing point of sale, and would carry a convenience fee surcharge for purchase.

The passage of the Patriotic Act and its associated compliance rules with respect to demographic data of cardholders effectively scuttled most of these programs, even though there were active beta tests being run around the country in many retail chains. Over the last two years, third party processors have fine-tuned their card issuance systems to become compliant with government standards as they relate to the capture of demographic data from perspective cardholders. Consequently, there are now numerous combinations of retail merchandising capabilities that can lead to the final issuance of an embossed, personalized, branded bankcard to a consumer.

There are many reasons why people would want to purchase such a product. For example, they might not have access to a conventional bank issued credit card, so they are effectively shut out from point of sale purchases, ATM devices, and on-line or over-the-phone purchases. Alternatively, a family that has a child away at college could use stored value cards to transfer money quickly and easily to the child. Such conveniences, coupled with real-time reporting capabilities provide a comfort level for both the sender and recipient. Whatever the reason, the instant issue bankcard product would well serve a retailer's customer base and build repeat traffic, enhance loyalty propositions, and create exciting manufacturer promotions.

One of the more popular incarnations of this product is the single pack STAR branded debit card. These single cards are usually sandwiched in a paper card stock package together with the issuer's terms and conditions sheet. The typical retail price for these products is $6.95-$9.95. A retail "Reload" is usually in the $3.50-$4.95 price range. These cards usually have limited capabilities. For example, they are useful for withdrawing funds at a STAR enabled ATM device, and if coupled with another card linked to the same card, can be used for limited money transfers. Depending on the processor's capabilities, a user identification number or PIN may be issued in a separate mailing or it can be created and delivered in a different manner. A limit of funding on these cards usually ranges from $500-$1,000. An option that is available to many perspective cardholders is the Bankcard upgrade. Once a perspective card purchaser goes through the Patriot Act compliance process via the Internet or a customer service phone operation, the card can be "upgraded" to a stored value embossed personalized Bankcard product, which gets forwarded to the cardholder in the mail.

On Jul. 17, 2002, the Department of the Treasury and seven federal financial institution regulators issued proposed rules pertaining to Section 326 of the USA Patriot Act. The Act includes provisions for fighting international money laundering and blocking terrorist access to the U.S. financial system. Section 326 of the Act addresses the creation of minimum requirements for verification of customer identification in the new account opening process. These rules are directed at financial institutions, which are defined as banks, insurance companies, mutual funds, credit card companies, money service businesses, broker dealers, futures commission merchants and casinos. Final rules were issued on May 9, 2003, which required financial institutions to be in compliance therewith by Oct. 1, 2003.

The Patriot Act compliance usually consists of the perspective cardholder supplying their name, address, home phone number, date of birth, and social security number. This information is linked to various databases through third parties and is checked against a list of terrorist and money launderers. For people that do not possess a US issued social security number, there are various forms of government issued means of identity that are acceptable. For debit card-based programs, the program owner and its banking partners open an account with a banking institution on behalf of the individual participants. This is required to safely and securely fund the cards and allow for seamless transaction activity whether ATM based or at point of sale. To be in compliance with the Act, financial institutions are required to keep an identifying record of the individual prior to opening an account.

Another product that is currently available is the dual card package, which has an ATM debit card or proxy card, as well as a second ATM debit card that has links to Cirrus and Maestro, printed on the reverse side. This second card requires Patriot Act compliance before it is activated, and again, the perspective cardholder can upgrade to a personalized Bankcard product.

In the first quarter of 2004, Visa announced new Visa Flag product options. Citing that debit volume at the point of sale was increasing globally at twice the rate of credit volumes, Visa decided to leverage the existing Electron product to create a new revenue vehicle for its issuing members in the United States. Previously the Electron product was only available overseas.

It is envisioned that this Instant Issue Visa Electronic card can take a variety of different forms at retail. For example, the retail package may have a pair of Visa Electronic cards plus a Debit card in the same package, or the retail package can have one Debit card with one Visa Electronic card. It is also envisioned that a single Visa Electronic card could be provided in a retail package, which would require OFAC (Office of Foreign Affairs and Currency) and Patriot Act compliance before utilization. All of these multiple card packages would be linked within a processing system so that money transfers could occur between the cards of registered users for real time, high speed transfer and funds availability world wide.

Seen as an entry level prepaid debit card product, the Electron product was viewed as a product that could leverage the Visa mark with low risk through enhanced issuer controls. The issuance of these Instant Issue cards will be limited to countries that have at least 95% of transactions processed at On-line capable terminals. One of the most interesting features of these Electron cards was the fact that that there is no embossed card numbers and no cardholder name in the package. The card will bear the familiar Dove hologram, must have an "Electronic Use Only" legend on the face of the card and must have an expiration date within three years of issuance. When the card is re-issued, it must comply with all personalization requirements for unembossed Visa Cards.

This electronic product is good for point of sale purchases and if coupled with Plus and Interlink useful at almost 1 million ATM devices worldwide. The estimated number of online Visa acceptance locations worldwide where this card may be utilized is almost 12 million.

These instant issue products, coupled with the right processor will open up a whole new world to cardholders. Seamless money transfer, real time reporting, and the availability of value added pre-paid products such as cellular phone minutes, long distance payphone calling, and others will only enhance the card holder experience and drive increased revenues for merchants, issuers and acquirers in the coming years.

It would be beneficial to provide a new and improved retail package for selling or otherwise distributing prepaid debit cards, including a proxy card adapted to be loaded with funds at a point of sale, and at least one debit card requiring registration prior to use, wherein the proxy card and the at least one debit card are linked within a processing system to facilitate fund transfers therebetween.

SUMMARY OF THE INVENTION

The subject invention is directed to a new and useful retail package for prepaid cards. The package includes opposed front and rear panels that are joined to one another along opposed right and left side edges and along opposed top and bottom edges. The package further includes a separable lower panel portion associated with the front and rear panels and defined by a horizontal perforation line that is spaced above the lower edge and extends from the left side edge to the right side edge.

A loadable proxy card is disposed within the package. The proxy card has an inverted magnetic stripe provided thereon (i.e., the stripe is located adjacent the bottom edge of the card as opposed to the top edge of the card) for storing data. The proxy card is secured between the front and rear panels and oriented in such a manner so that the magnetic stripe is located below the horizontal perforation line defining the separable lower panel. At least one other card is retained between the front and rear panels of the package above the proxy card.

The retail package further includes a separable side panel portion that is associated with the front and rear panels and defined by a vertical perforation line spaced inwardly from the right side edge and extending from the horizontal perforation line toward the upper edge. A second horizontal perforation line is defined in the front panel of the package, spaced below the upper edge and intersecting the vertical perforation line to define a separable upper panel portion.

Preferably, a center panel is provided between the front and rear panels. The center panel is bounded by the vertical perforation line and the two horizontal perforation lines, and is joined to the front panel of the package along the right side edge thereof. The proxy card and the other card(s) are secured to the center panel, preferably using conventional means such as releasable glue or a releasable tape product. Preferably, an aperture is defined in the front and rear panels of the package above the second horizontal perforation line for suspending the package from a display peg or J-hook. In addition, at least one viewing window is provided in the front panel of the package for viewing the contents of the package, and in particular, for showing a holographic image emblematic of the card issuer.

In accordance with the subject invention, the proxy card and the at least one other card retained in the package are linked within a processing system to facilitate fund transfers therebetween. It is envisioned that the proxy card is a pin-based debit card that is adapted to be loaded with funds at a point of sale. The proxy card is preferably configured to be loaded with funds up to a predefined limit. Preferably, the at least one other card is an electronic debit card requiring registration prior to use. The required registration is based on Patriot Act/OFAC compliance. Furthermore, it is envisioned that the at least one electronic debit card is without embossed card numbers and without a cardholder name. Instead, the cardholder's name and the card numbers are preferably indent printed on the face of the card.

In another preferred embodiment of the subject invention, the at least one other card in the package is a generic replica or imitation of an actual electronic bankcard (i.e., a faux bankcard), which serves as a promotional vehicle. This card may be plastic or paper-based, would not have embossing thereon, or a magnetic stripe and would have a generic number imprinted thereon. The replica is positioned in such a manner within the package so that a holographic image emblematic of the card issuer is displayed in the viewing window in the front panel of the package. In such an instance, the consumer will seek Patriot Act/OFAC approval following the purchase of the package, and upon approval, an actual personalized electronic debit card will be delivered or otherwise provided to the consumer by mail or by similar means.

The subject invention is further directed to a retail package for prepaid cards that includes a card retainer, a proxy card retained by the retainer and adapted to be loaded with funds at a point of sale, and at least one debit card retained by the retainer and requiring registration prior to use, wherein the proxy card and the at least one debit card are linked within a processing system to facilitate fund transfers therebetween after registration of the at least one debit card.

Preferably, the proxy card is a pin-based debit card and is adapted to be loaded with funds up to a predefined limit. However, the proxy card may also be a non-pin-based debit card. As to the debit card, the required registration is based on Patriot Act/OFAC compliance and it is an electronic debit card that may be without embossed card numbers or a cardholder name. That is, the cardholder's name and the card numbers may be indent printed.

The subject invention is further directed to a method for distributing prepaid cards that includes the steps of selling a proxy card and at least one debit card to a customer, wherein the at least one debit card requires Patriot Act/OFAC compliance prior to use, loading funds onto the proxy card at the point of sale, facilitating a registration process to obtain Patriot Act/OFAC compliance for the at least one debit card, and activating the at least one debit card if approval is obtained. The method further includes the step of facilitating fund transfers between the proxy card and the at least one debit card.

The method further includes the steps of receiving cash from a customer at the point of sale for the value of funds to be loaded onto the proxy card, performing a retail approval process at the point of sale to determine whether the proxy card may be provided to the customer, providing the customer with the proxy card and a receipt if retail approval is obtained, or providing a refund to the customer if retail approval is declined.

In accordance with the subject invention, the registration process for obtaining Patriot Act/OFAC compliance for the at least one debit card is performed by a customer via the Internet, via telephone or at a kiosk. In the case of a kiosk, the funds for the proxy card are loaded into a bill acceptor associated with the kiosk.

In accordance with the subject invention, the at least one debit card is provided to the customer at the point of sale after the customer has obtained Patriot Act/OFAC compliance. Alternatively, the at least one debit card may be sent to the customer after the customer has obtained Patriot Act/OFAC compliance.

These and other aspects of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to employ the retail package for and method of distributing prepaid cards of the present invention, embodiments thereof will be described in detail hereinbelow with reference to the drawings, wherein.

DETAILED DESCRIPTION OF THE PREFERRED EMBODIMENTS

Figure 1:
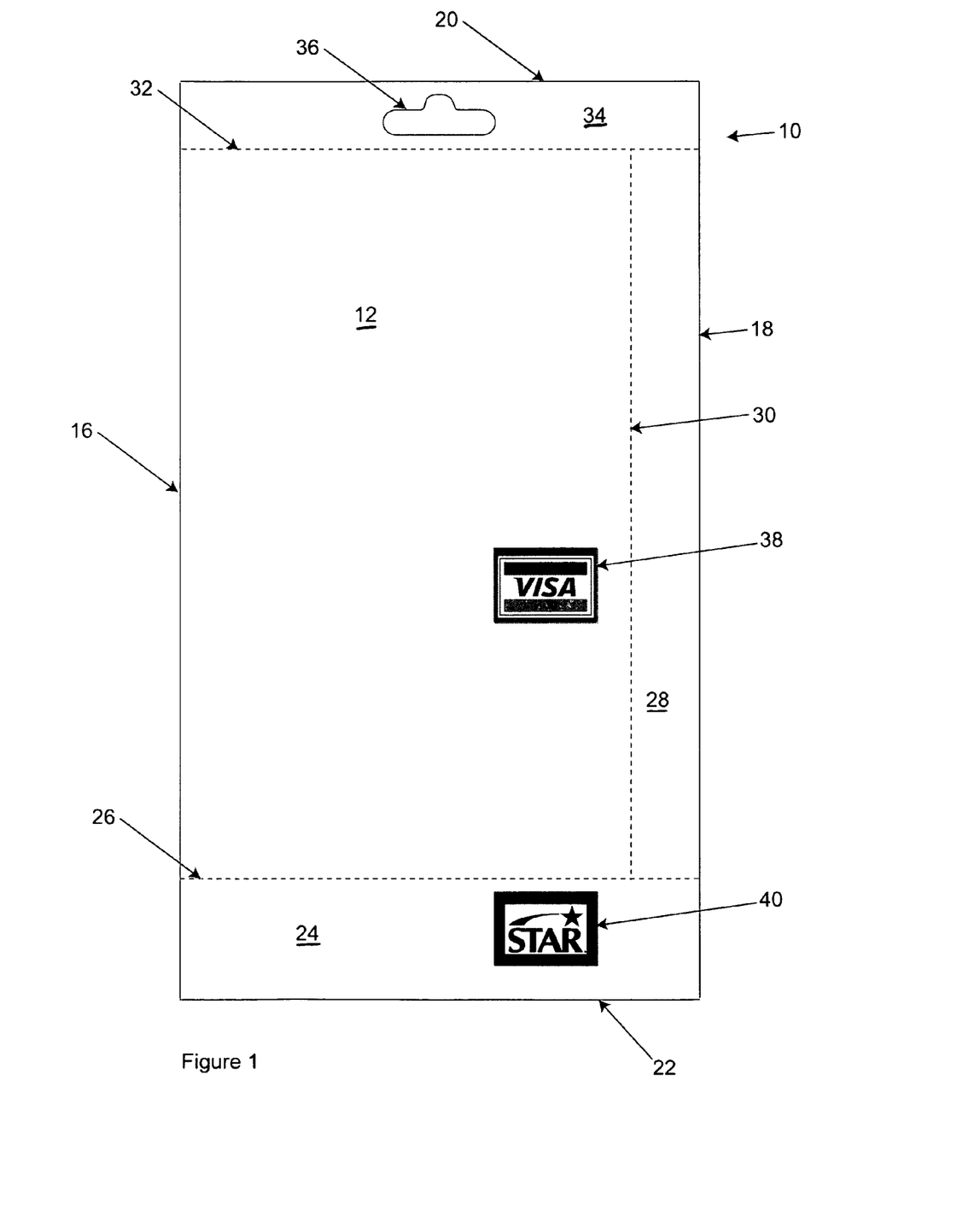
FIG. 1 is a front plan view of a closed retail package constructed in accordance with a preferred embodiment of the subject invention, which has two viewing windows in the front panel for viewing the contents of the package.

Referring now to the drawings wherein like reference numerals identify similar structural features or aspects of the subject invention, there is illustrated in FIG. 1 a retail package for prepaid cards constructed in accordance with a preferred embodiment of the subject invention and designated generally by reference numeral 10.

Retail package 10 is adapted and configured to facilitate the distribution of prepaid cards at a retail establishment. In particular, a consumer would pay a predetermined amount for the package 10, for example, $24.95. The package 10 preferably contains a proxy card in the form of a pin-based debit card adapted to be loaded with funds up to a predefined limit, and one or more electronic debit cards or a similar bankcard product that require registration to obtain Patriot Act and OFAC compliance before use.

Figure 2:
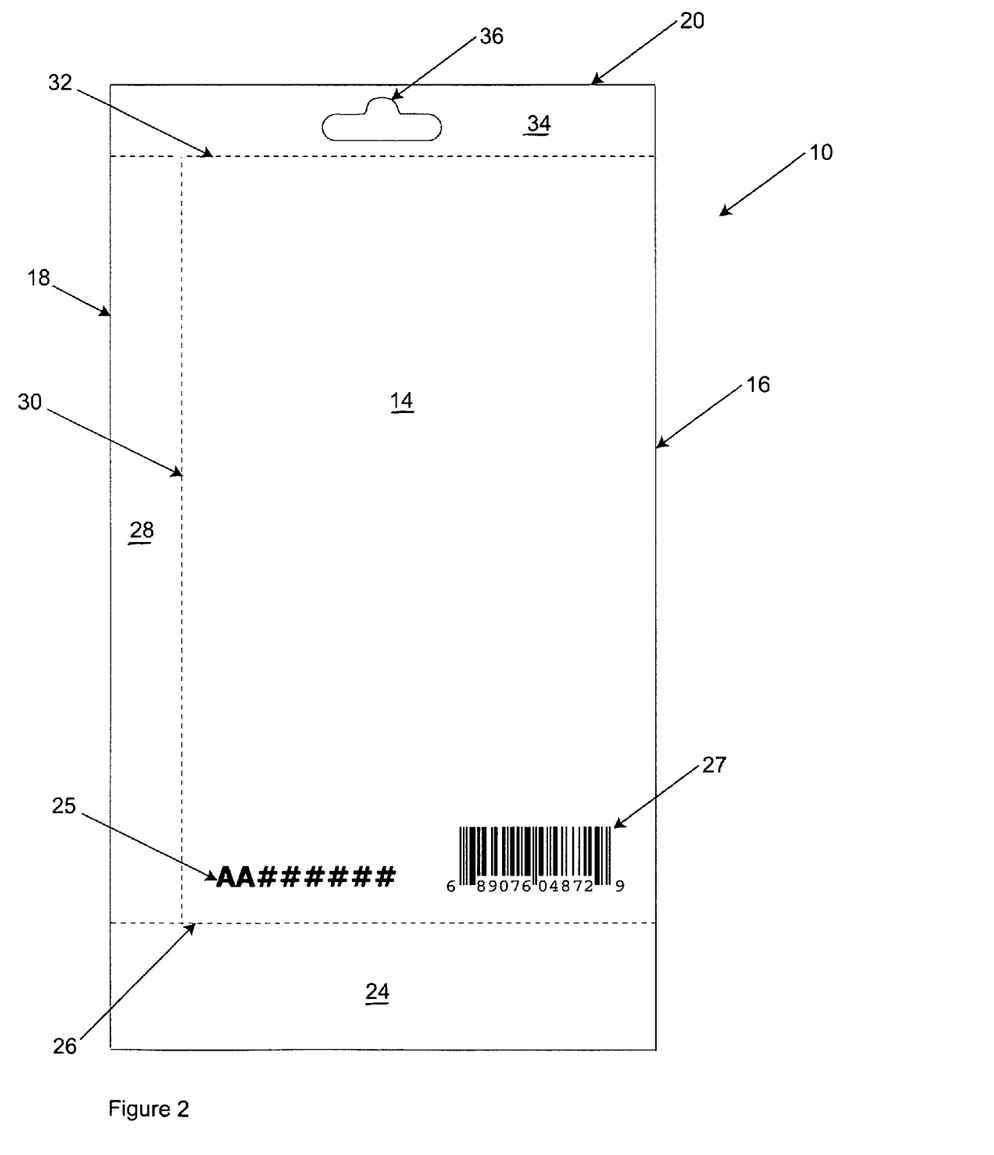
FIG. 2 is a rear plan view of the retail package of FIG. 1, which has a product identification number and bar code on the rear panel of the package.

At the point of sale, the retailer would process the purchase by way of a product identification code or bar code associated with rear panel of the retail package 10 (see FIG. 2). A back end processor recognizing the purchase then moves the proxy debit card from an inactive card file to an active card file. The consumer can then provide funds to the retailer to apply onto the proxy debit card up to a predetermined limit, for example, $500. Thereafter, the consumer receives a receipt for the transaction, and is able to utilize the funds at networks that are enabled on the retail debit card.

At the end of the day or at some other point of time, the card processor initiates an ACH process through the Automated Clearing House network on behalf of the card-issuing bank to debit the DDA account of the retailer in the amount of the funds that were underwritten by the bank at the point of sale. After leaving the store, the consumer logs onto an Internet site, or calls an operator assisted help desk to go through Patriot Act and OFAC registration so that the bank can activate the additional electronic debit cards contained in retail package 10. Once properly registered, the back-end processor allows movement of funds from the proxy debit card to the electronic debit card(s) seamlessly within the system. At such a time, the electronic debit cards or bankcards can be used at any participating retailer that accepts Association Bankcards, or at the major worldwide ATM networks such as PLUS, or CIRRUS.

Referring to FIGS. 1 through 4, retail package 10 includes opposed front and rear panels 12, 14 joined or otherwise attached to one another along opposed left and right side edges 16, 18 edges and along opposed top and bottom edges 20, 22. A separable lower panel portion 24 is associated with the front and rear panels 12, 14 and defined by a horizontal perforation line 26 spaced above the lower edge 22 and extending from the left side edge 16 to the right side edge 18. A separable side panel portion 28 is associated with the front and rear panels 12, 14 and is defined by a vertical perforation line 30 spaced inwardly from the right side edge 18 and extending from the horizontal perforation line 26 toward the top edge 20 of package 10. A second horizontal perforation line 32 is defined in the front and rear panels 12, 14 of package 10 spaced below the top edge 20 and intersecting the vertical perforation line 30 to define a separable upper panel portion 34.

A shaped aperture 36 is formed in the upper panel portion 34 of the front and rear panels 12, 14 of package 10 above the second horizontal perforation line 32 for suspending the package 10 from a display peg or J-hook. A transparent viewing window 38 is provided in the front panel 12 of package 10 for viewing contents of the package 10, for example, a holographic image and/or emblem associated with an electronic debit card located in that area of the package.

Figure 1A:
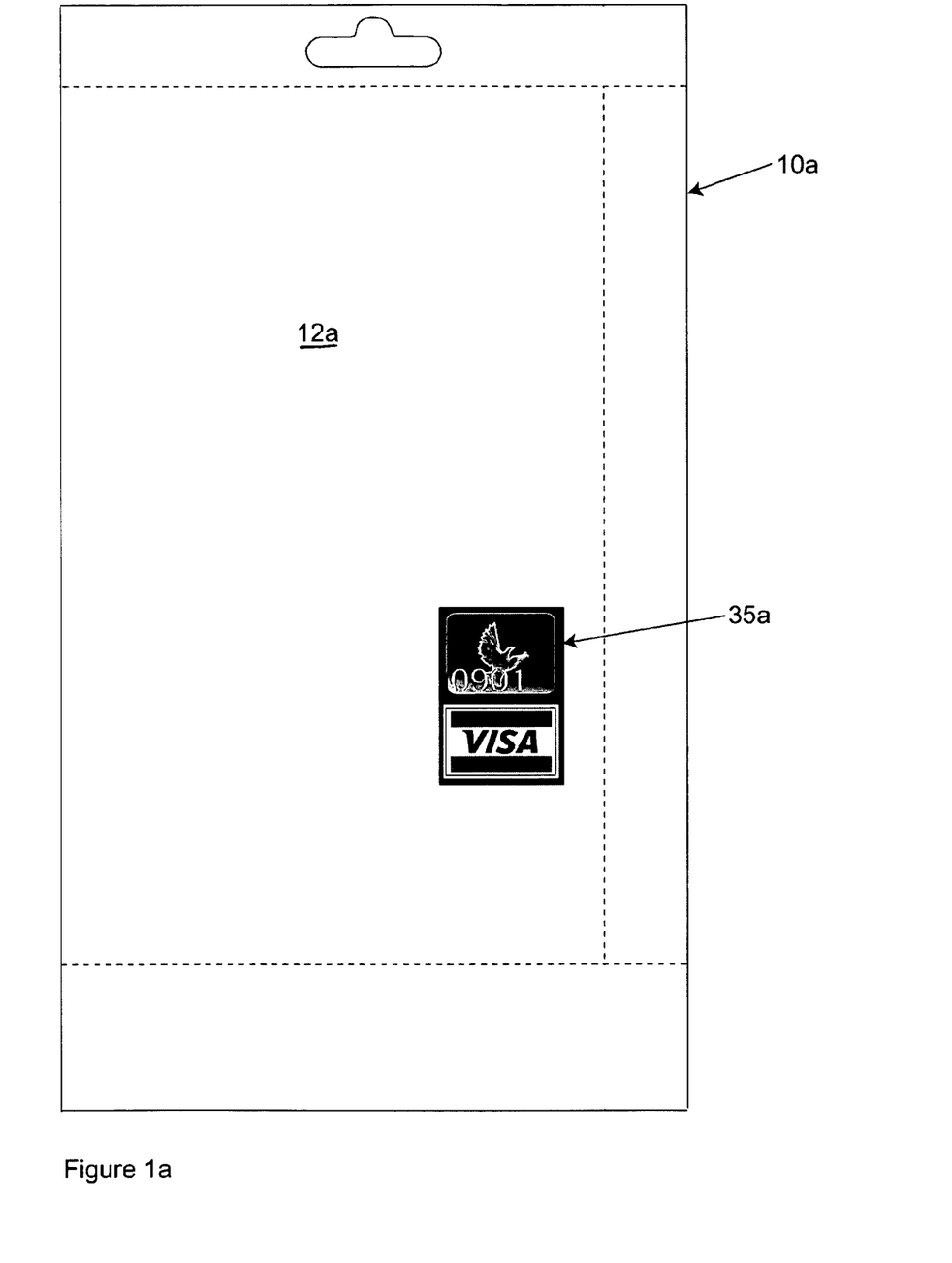
FIG. 1a is a front plan view of another closed retail package constructed in accordance with a preferred embedment of the subject invention, which has a single viewing window in the front panel for viewing the contents of the package.

In addition, a second transparent viewing window 40 is provided in the separable lower panel portion 24 for viewing contents of the package 10, for example, a holographic image and/or emblem associated with the proxy debit card located in that area of the package. The size and shape of one or both of the two windows can vary depending upon the contents of the package, or one or both of the two windows 38, 40 can be excluded from the package. For example, in another embodiment of the invention, a single larger window 38a is formed in the front panel 12a of retail package 10a for displaying a larger portion of the package contents.

Referring to FIG. 2, the rear panel 14 of retail package 10 includes product information to facilitate the sale of the package. In particular, the rear panel 14 includes an alphanumeric product identification code 25 that can be utilized by the cashier to record the sale or a bar code and associated UPC code 27 that can be used by the cashier to record the sale.

Figure 3:
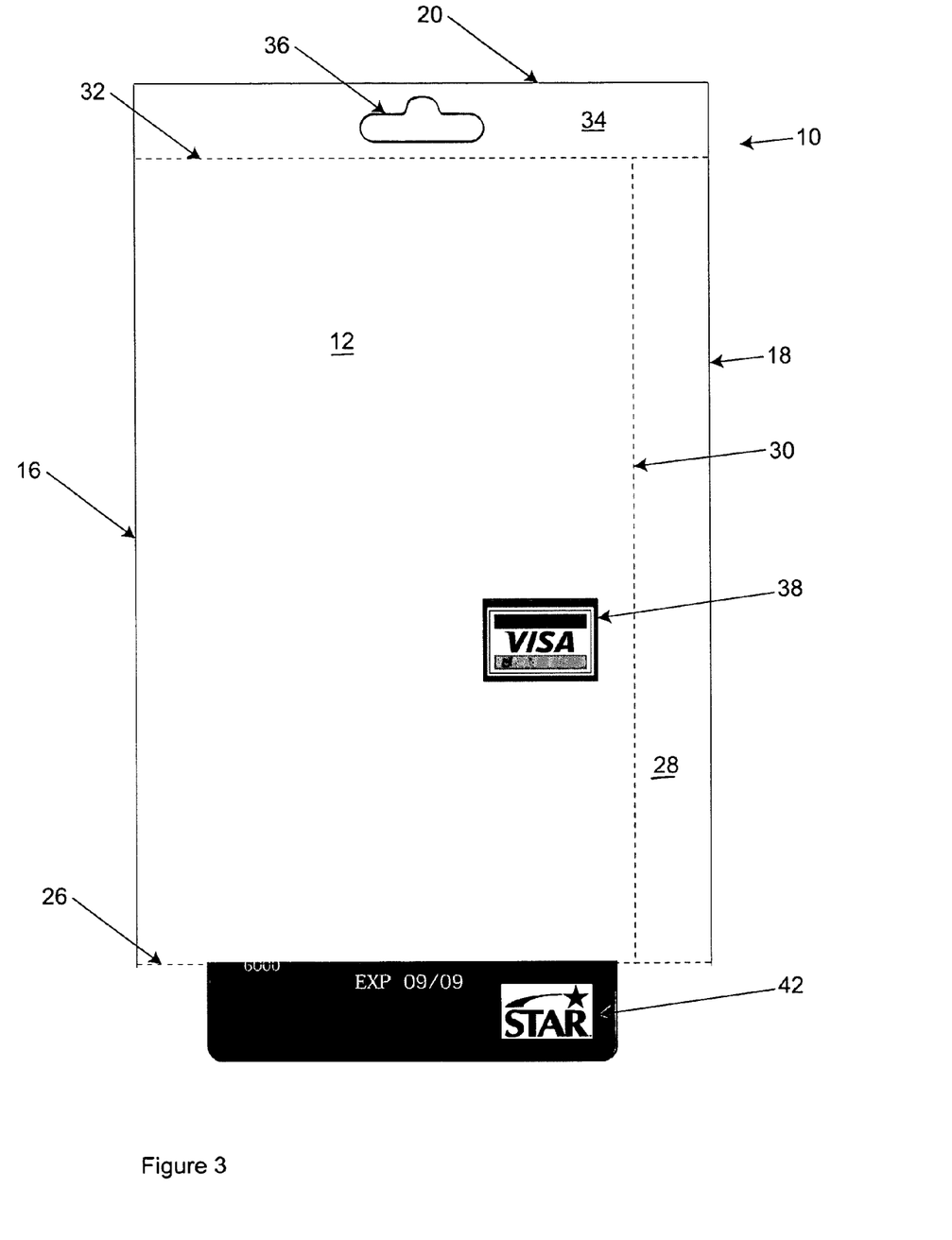
FIG. 3 is a front plan view of the retail package shown in FIG. 1, with the separable lower panel portion removed to expose the loadable proxy card retained by the package.
Figure 4:
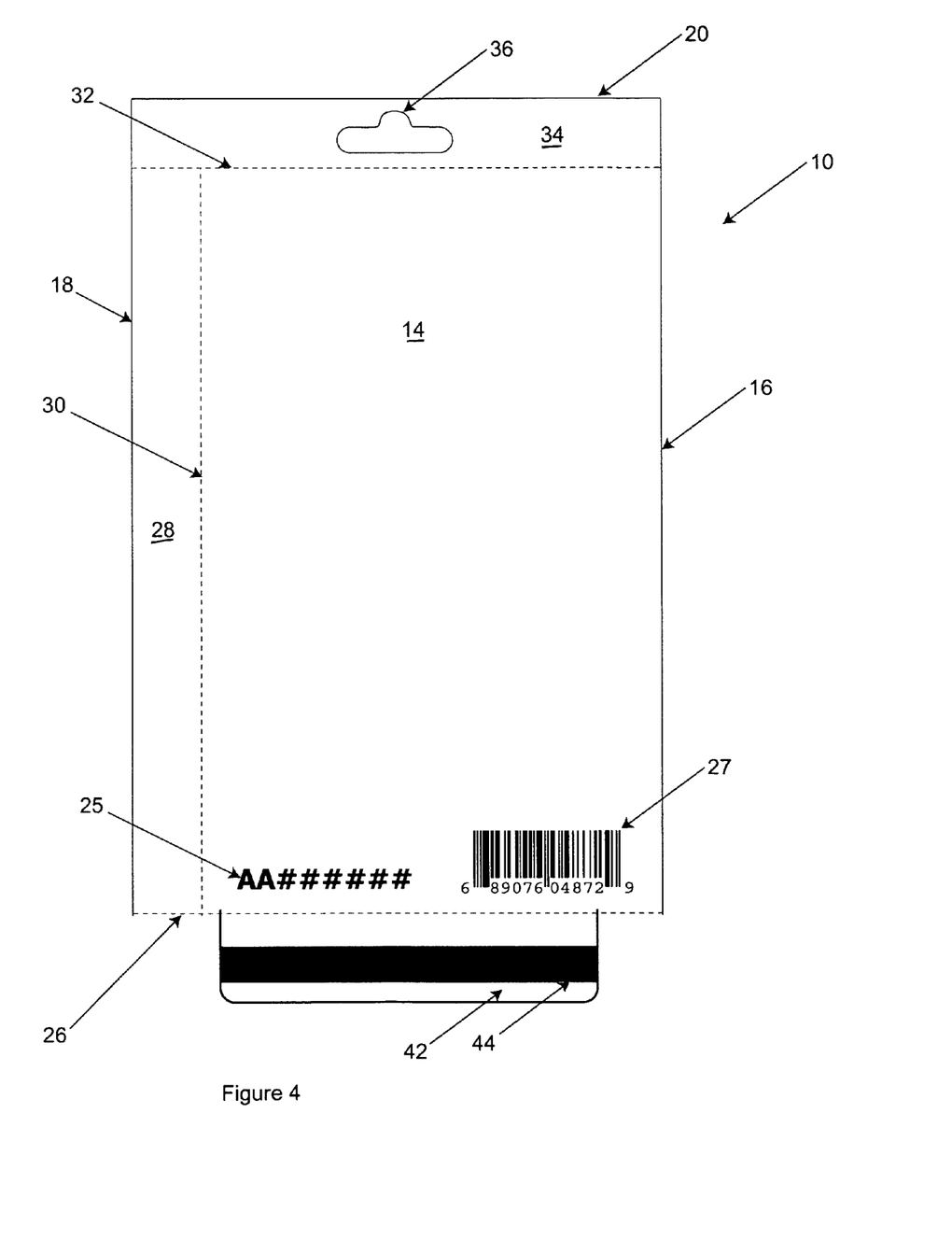
FIG. 4 is a rear plan view of the retail package shown in FIGS. 1 and 3, with the separable lower portion removed, illustrating the inverted magnetic stripe of the exposed loadable proxy card retained within the package.

Referring to FIGS. 3 and 4, the bottom panel portion 24 of retail package 10, once removed, exposes the lower portion of the proxy debit card 42, and more particularly, the inverted magnetic stripe 44 provided on the rear surface of the card adjacent the lower edge thereof. With the inverted magnetic stripe 44 exposed, a cashier can readily load funds onto the proxy debit card 42 at the point of sale in a conventional manner, i.e., using an electronic draft capture (EDC) device.

Figure 5:
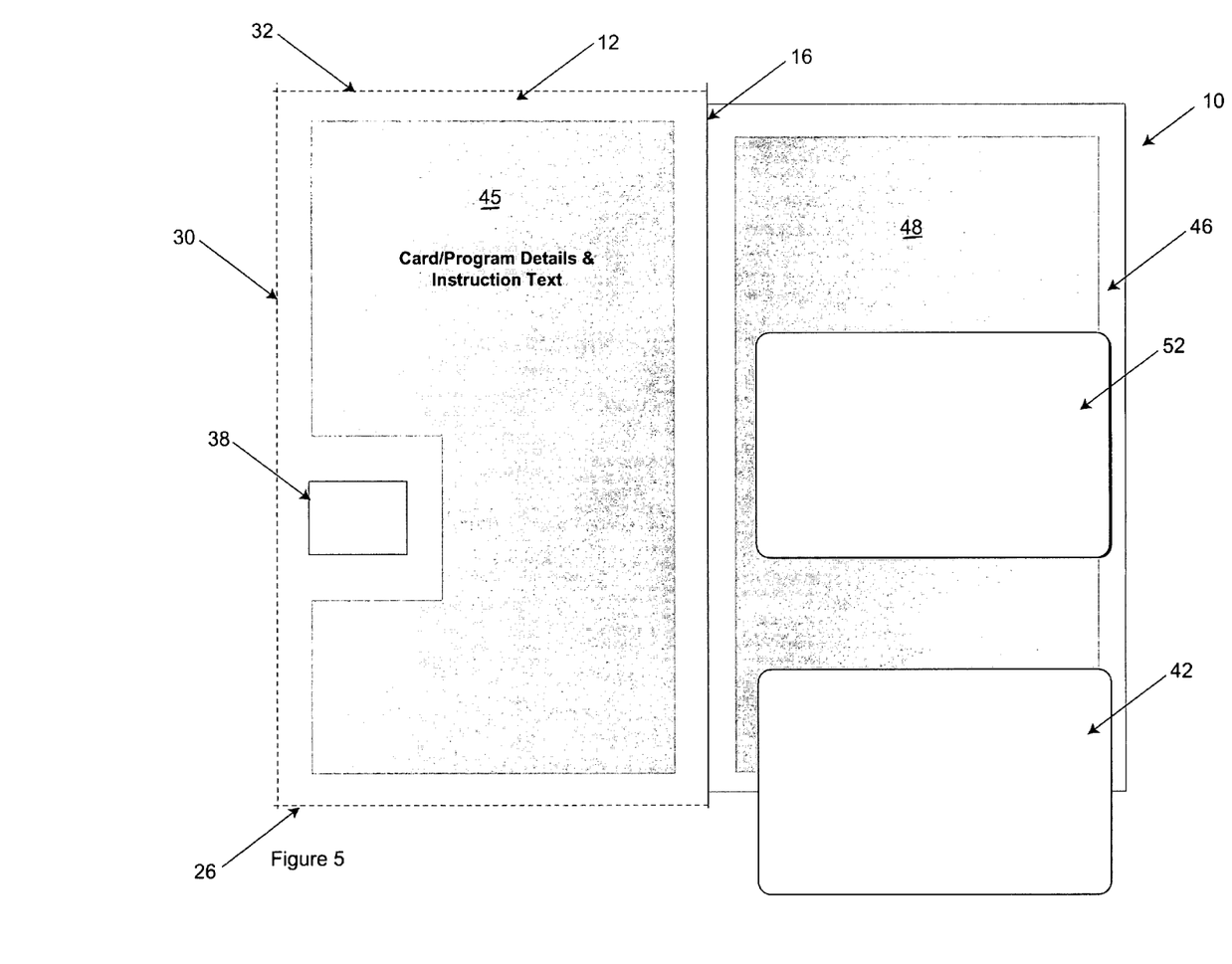
FIG. 5 is a plan view of the retail package of FIG. 1 with the separable upper and side panel portions removed from the package, and with the front panel of the package opened to reveal the first and second inner pages of the package, wherein the first inner page has informative indicia imprinted thereon and the second inner page supports the loadable proxy card and an electronic debit card.

Referring now to FIG. 4, to gain ready access to the interior of retail package 10, and more particularly, the additional electronic debit card(s) located therein, the separable upper panel portion 34 is removed along perforation line 32. The separable side panel portion 28 is also removed along perforation line 30. Upon removal of the upper and side panel portions 34, 28, the front panel 12 may be folded open in a book-like manner to reveal the first inner page 45 of the package located on the rear side of front panel 12, and the center panel 46, which is provided between the front and rear panels 12, 14, as shown in FIG. 5. Vertical perforation line 30 and the two horizontal perforation lines 26, 34, bound the center panel 46 of retail package 10. Center panel 46 is joined or otherwise attached to the front panel 12 of package 10 along the right side edge 16 thereof. The center panel 46 defines a second inner page 48 and a third inner page 50.

The loadable proxy card 42, with its inverted magnetic stripe 44 for storing data, is secured to the second inner page 48 defined by the center panel 46 with a releasable adhesive or tape. Proxy card 42 is oriented in such a manner so that the magnetic stripe 44 adjacent the bottom edge of the card is located below the horizontal perforation line 26 defining the separable lower panel 24. This location enables the proxy card 42 to be slide through an EDC device so that funds can be readily loaded onto the card at the point of sale. As mentioned previously, the proxy card 42 can be a pin-based debit card adapted to be loaded with funds up to a predefined limit. This card does not require Patriot Act or OFAC compliance prior to use by the customer.

A second card 52 is secured to the second inner page 48 defined by the center panel 46 between the front and rear panels 12, 14 of package 10 above the proxy card 42. The second card 52 differs from the first card 42 in that it is a type of debit card or bankcard requiring registration prior to use. The required registration is based on Patriot Act and/or OFAC compliance rules. The second card can be an electronic debit card, which is a product that has indented indicia and is without embossed card numbers and without a cardholder name. This provides a certain aspect of security to thwart or otherwise prevent fraudulent use of the card.

In accordance with a preferred embodiment of the subject invention, the proxy card 42 and the electronic debit card 52 are linked within a processing system to facilitate fund transfers therebetween. Therefore, once debit card 52 has been properly registered, funds may be conveniently transferred from the proxy card 42 to the electronic debit card 52 using conventional electronic funds transfer techniques. Thereafter, the debit card 52 may be used in a conventional manner (i.e., without a PIN number) at any participating retailer that accepts Association Bankcards, or at the major worldwide ATM networks with a PIN.

Figure 6:
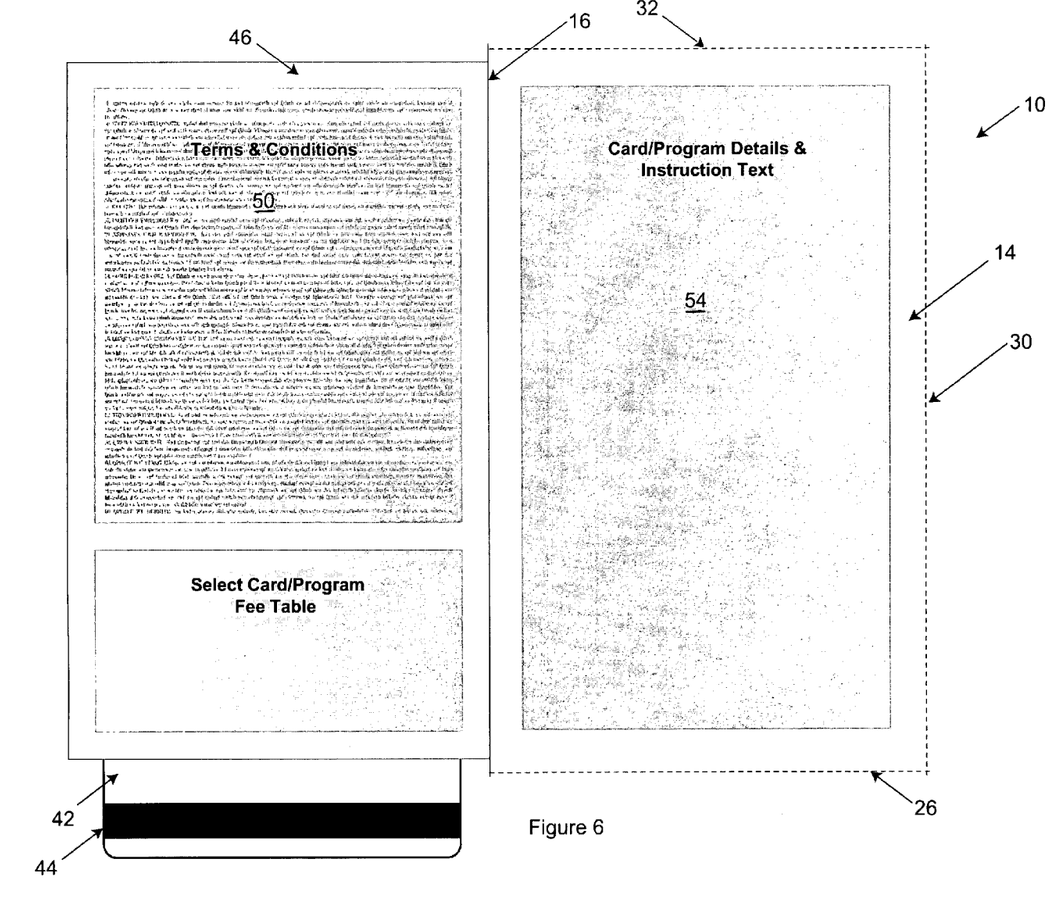
FIG. 6 is a plan view of the retail package of the subject invention with the separable upper and side panel portions removed from the package, and with the rear panel opened to reveal the third and fourth inner pages of the package, which have informative indicia imprinted thereon.

The first inner page 45, as well as the third and fourth inner pages 50, 54, which are shown in FIG. 6, contain or other have imprinted thereon informational indicia relating to the cards 42, 52 contained within retail package 10. Such information includes, without limitation, instructions for registering the debit card 52, instructions for loading/reloading funds onto the proxy card 42 or the electronic debit card 52, long distance telephone calling instructions for cardholders, information for access to value added third party content, fee tables and a card holder agreement with various terms and conditions relating to the use and/or retail sale of the cards 42, 52.

In another embodiment of the subject invention, the second card 52 is a generic replica or an imitation of an actual electronic bankcard (i.e., a faux bankcard), which serves as a promotional vehicle. This second card may be plastic or paper-based, would not have embossing thereon, or a magnetic stripe and would have a generic number imprinted thereon. In this embodiment of the invention, the consumer will seek Patriot Act/OFAC approval following the purchase of the package 10, and upon approval, an actual personalized electronic debit card will be delivered or otherwise provided to the consumer by mail or by similar means. In certain instances, if Patriot Act/OFAC approval is obtained at the point of sale, the consumer may be provided with an actual electronic debit card in real time.

Figure 7:
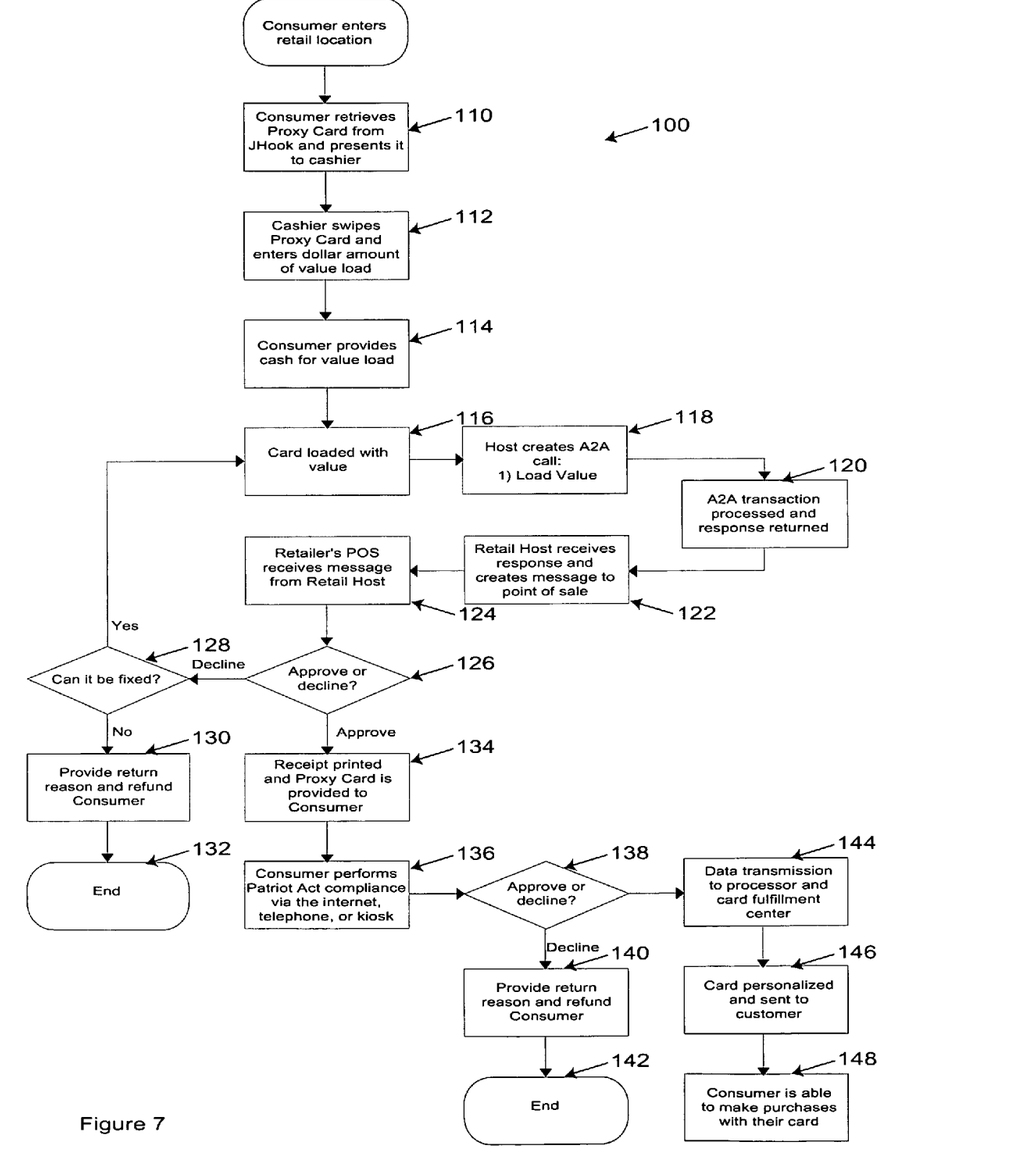
FIG. 7 is a flow chart illustrating a method of distributing prepaid cards at a retail point of sale in accordance with a preferred embodiment of the subject invention.

Referring now to FIG. 7, there is illustrated a process flow chart depicting a method of distributing prepaid cards at a retail establishment in accordance with a preferred embodiment of the subject invention, which is designated generally by reference numeral 100. The method or process 100 begins at step 110 when a consumer retrieves a retail package 10 from a display peg or J-hook and presents it to a cashier for purchase. The package includes a proxy card 42 and at least one electronic debit card 52 requiring registration. At such a time the cashier scans or otherwise processes a product code 25 or a bar code 27 on the rear panel 14 of package 10, and records or otherwise effectuates the sale of the retail package 10 to the consumer.

Then, at step 112, the cashier removes the detachable lower panel portion 24 from the package 10 to expose the inverted magnetic stripe 44 adjacent the bottom edge of the proxy card 42 retained in the package, and then enters the dollar amount of the value to be loaded onto the card into an EDC device that may be incorporated into a computer, electronic cash register or a similar machine. The dollar amount loaded onto the debit card is selected or otherwise designated by the customer and is preferably an amount that is less than or equal to a predefined limit, for example, $500. Thereafter, at step 114, the consumer provides cash to the cashier so that the cash value can be loaded onto the proxy debit card 42 retained within the package 10. At step 116 the cashier loads that value onto the proxy card 42 by swiping the inverted magnetic stripe 44 though an electronic encoding device.

Then, a processing loop takes place wherein the retail terminal associated with the point of sale communicates with a processing host, which creates an application-to-application call corresponding to the load value at step 118. Then at step 120, a third party processes the transaction and returns a response to the retail host computer. The retail host computer receives the response at step 122 and creates a message to the point of sale. At step 124, the retailer's point-of-sale terminal receives a message from the retail host computer concerning the transaction.

Based upon the processing loop, a determination is made at step 126 as to whether the cash value designated by the customer can be loaded onto proxy card 42. If the transaction is declined, a determination is made at step 128 as to whether the reason for being declined is associated with a problem that can be corrected. If the problem can be corrected the process returns to step 116 and the cashier attempts to reload the cash value onto the proxy card 42 again. If the problem cannot be corrected, the reason for being declined is provided and a refund is made to the consumer at step 130, whereupon the process ends at step 132. If, at step 126, the value upload to the proxy card 42 is approved, a receipt is printed at step 134 and provided to the consumer.

At step 136, the consumer performs a registration procedure to obtain Patriot Act/OFAC compliance. This may be done through an Internet website, at the point-of-sale using a telephone, or through a dedicated kiosk. At step 138, a determination is made as to whether the registration information provided by the consumer is Patriot Act/OFAC compliant. If the registration information is not compliant, the consumer is declined at step 138. Thereafter, a refund is provided to the consumer at step 140 and the process ends at step 142. If the registration information entered at step 136 is found to be compliant at step 138, a data transmission is made to a processing host such as, for example, Symmetrix or to an issuing bank, at step 144, in order to effectuate activation of the electronic debit card(s) 52, in accordance with a preferred embodiment of the subject invention.

Thereupon, the electronic debit card(s) 52 contained within the retail package 10 are activated on the system. As a result, the card(s) 52 are enabled at bankcard association retailers and association ATM networks. At such a time, the consumer is able to make purchases with their electronic debit card/bankcards and make find transfers between the proxy card 42 and the electronic debit cards(s) 52 in conventional modes. For example, using a personal computer, the Internet or by way of an automated telephone system, such as, an IVRU system.

It is envisioned and well within the scope of the scope of the subject disclosure that the retail package 10 of the subject invention may be sold or otherwise distributed with a proxy card only. That is, the package would not include any electronic debit cards requiring registration. In such a case, the data transmission to the processing host and bank at step 144, is also sent to a card fulfillment center. Thereafter, at step 146, one or more personalized electronic debit cards 52 are sent to the consumer, which may then be used to make purchases or transfer funds at step 148.

Figure 8:
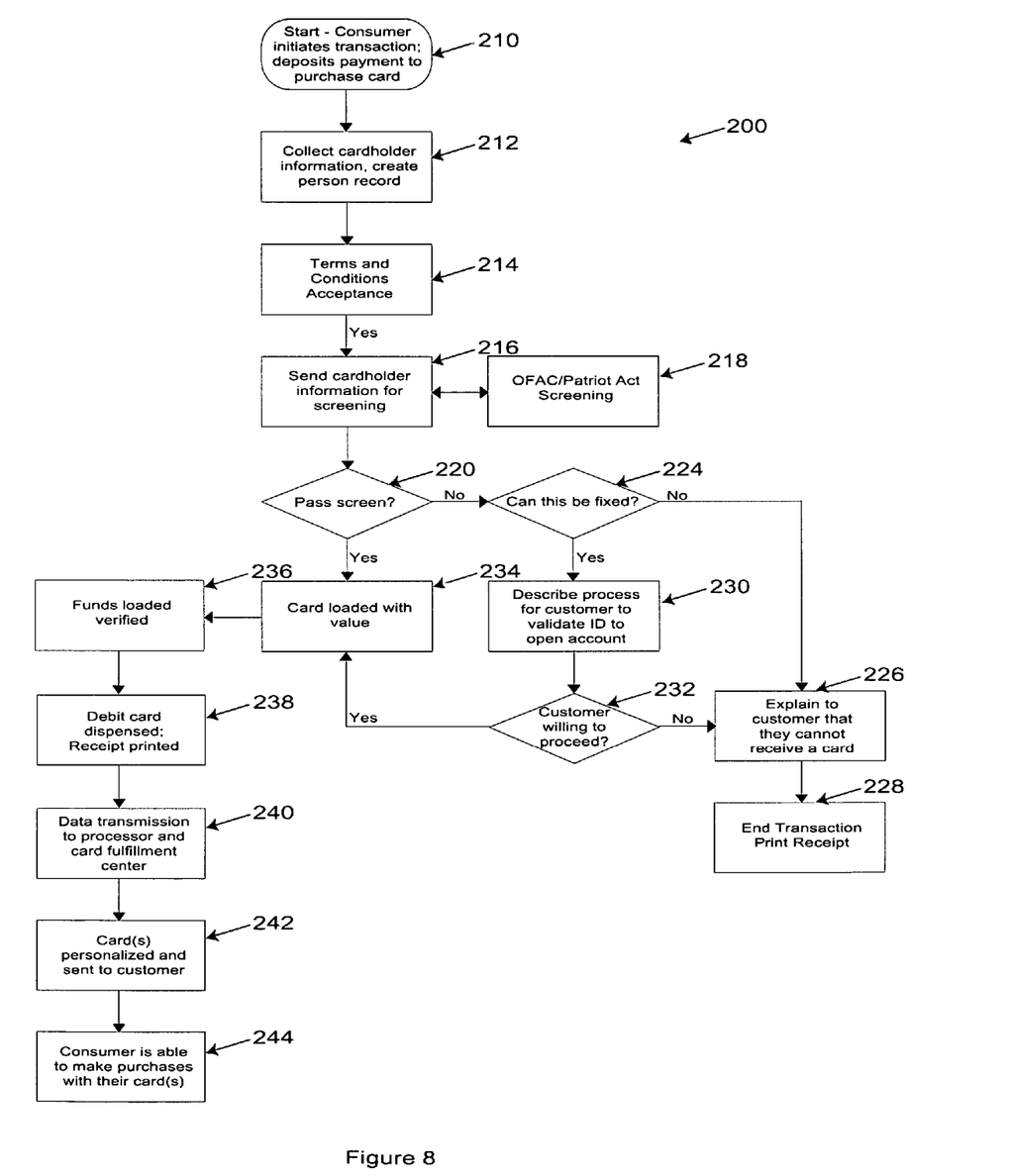
FIG. 8 is a flow chart illustrating a method of distributing prepaid cards at a kiosk in accordance with a preferred embodiment of the subject invention.

Referring now to FIG. 8, there is illustrated a process flow chart depicting a method of distributing prepaid cards through a dedicated kiosk in accordance with a preferred embodiment of the subject invention, which is designated generally by reference numeral 200. The method or process 200 commences at step 210 when a consumer initiates a transaction by depositing payment to purchase a debit card. Cardholder information is collected to create a personal record at step 212. Then, at step 214 the consumer is asked to accept the terms and conditions associated with the card purchase. If the consumer accepts the terms and condition, the cardholder information obtained at step 212 is sent for OFAC/Patriot Act screening at step 216. The screening process occurs at step 218.

A determination is made at step 220 as to whether the cardholder information obtained at step 212 is OFAC/Patriot Act compliant. If the cardholder information obtained at step 212 is not compliant, a determination is made at step 224 as to whether the problem is one that can be corrected. If the problem cannot be corrected, an explanation is given to the consumer at step 226, at which time the consumer is informed that they cannot receive an electronic debit card. Thereafter, at step 228, the transaction ends and a receipt is printed. However, if at step 224, the problem can be corrected, a description is given to the consumer at step 230 of a process by which the consumer can validate their identification to open an account and receive a debit card. If, at step 232, the consumer is willing to proceed with the additional validation process, a selected value can be loaded onto the proxy debit card at step 234. At such a time, the consumer can load funds into a bill acceptor of the kiosk or the consumer can also load funds onto the proxy card by way of a card-to-card transfer from another debit card or from a credit card held by the consumer.

If, at step 220, a determination is made that the cardholder information obtained at step 212 is OFAC/Patriot Act compliant, the consumer loads funds into a bill acceptor of the kiosk at step 234. The funds are then loaded onto the proxy debit card. Funds can also be loaded onto the proxy card by way of a card-to-card transfer from another debit card or from a credit card held by the consumer. At step 236, verification is given to the consumer, which indicates that the funds were properly loaded onto the proxy debit card. The proxy debit card is then dispensed from the kiosk at step 238. Thereafter, data is transmitted to a processor and card fulfillment center at step 240, and one or more personalized electronic debit cards are sent to the consumer at step 242. Thereupon, the consumer is able to make purchases with their cards, and transfer funds therebetween in a conventional manner (e.g., by telephone, computer or Internet), as indicated at step 244. In an alternative embodiment of the subject invention, the consumer may simply purchase a debit card at the kiosk, load funds onto the card and forgo the rest of the process.

Although the subject invention has been described with respect to preferred embodiments, those skilled in the art will readily appreciate that changes and modifications may be made thereto without departing from the spirit and scope of the subject invention as defined by the appended claims.

What is claimed is:

1. A retail package for prepaid cards comprising:
    a) opposed front and rear panels joined to one another along opposed right and left side edges and along opposed top and bottom edges;
    b) a separable bottom panel portion associated with the front and rear panels and defined by a horizontal perforation line spaced above the lower edge and extending from the left side edge to the right side edge; and c) a loadable proxy card having a magnetic stripe provided thereon adjacent a lower edge thereof for storing data, wherein the proxy card is secured between the front and rear panels and oriented in such a manner so that the magnetic stripe is located below the horizontal perforation line defining the separable lower panel, wherein at least one other card is retained between the front and rear panels of the package above the proxy card, and wherein the proxy card and the at least one other card retained in the package are linked within a processing system to facilitate fund transfers therebetween, wherein the proxy card is one of a pin-based debit card and a non-pin-based debit card that is adapted to be loaded with funds at a point of sale, wherein the proxy card is configured to be loaded with funds up to a predefined limit, the at least one other card is an electronic debit card requiring registration prior to use, and the required registration is based on providing a name, an address, a phone number, a date of birth, and a social security number.

2. A retail package for prepaid cards as recited in claim 1, wherein a separable side panel portion is associated with the front and rear panels and is defined by a vertical perforation line spaced inwardly from the right side edge and extending from the horizontal perforation line toward the top edge.

3. A retail package for prepaid cards as recited in claim 2, wherein a second horizontal perforation line is defined in the front and rear panels of the package spaced below the top edge and intersecting the vertical perforation line to define a separable upper panel portion.

4. A retail package for prepaid cards as recited in claim 1, wherein a center panel is provided between the front and rear panels, and is bounded by the vertical perforation line and the two horizontal perforation lines.

5. A retail package for prepaid cards as recited in claim 4, wherein the center panel is joined to the front panel of the package along the right side edge thereof.

6. A retail package for prepaid cards as recited in claim 4, wherein the proxy card and the at least one other card are secured to the center panel.

7. A retail package for prepaid cards as recited in claim 3, wherein an aperture is defined in the front and rear panels of the package above the second horizontal perforation line for suspending the package from a display peg.

8. A retail package for prepaid cards as recited in claim 1, wherein a viewing window is provided in the front panel of the package for viewing contents of the package.

9. A retail package for prepaid cards as recited in claim 1, wherein the at least one electronic debit card has indent printed card numbers.

10. A retail package for prepaid cards as recited in claim 1, wherein the at least one electronic debit card is without a cardholder name.

11. A retail package for prepaid cards as recited in claim 1, wherein the at least one other card is a replica of an electronic debit card.

12. A retail package for prepaid cards comprising:
a) a card retainer;
b) a proxy card retained by the retainer and adapted to be loaded with funds at a point of sale; and
c) at least one debit card retained by the retainer and requiring registration prior to use, wherein the proxy card and the at least one debit card are linked within a processing system to facilitate fund transfers therebetween after registration of the at least one debit card, wherein the required registration is based on providing a name, an address, a phone number, a date of birth, and a social security number.

13. A retail package for prepaid cards as recited in claim 12, wherein the proxy card is one of a pin-based debit card and a non-pin-based debit card.

14. A retail package for prepaid cards as recited in claim 12, wherein the proxy card is adapted to be loaded with funds up to a predefined limit.

15. A retail package for prepaid cards as recited in claim 12, wherein the at least one debit card is an electronic debit card having indent printed card numbers.

16. A retail package for prepaid cards as recited in claim 12, wherein the at least one debit card is an electronic debit card without a cardholder name.

17. A retail package for prepaid cards as recited in claim 12, wherein the at least one other card is a replica of an electronic debit card, and wherein an actual electronic debit card is provided to a purchaser of the package upon obtaining approval.

18. A method for distributing prepaid cards comprising the steps of:
a) selling a proxy card and at least one debit card to a customer wherein the at least one debit card requires Patriot Act/OFAC compliance prior to use;
b) loading funds onto the proxy card at the point of sale;
c) facilitating a registration process to obtain providing a name, an address, a phone number, a date of birth, and a social security number for the at least one debit card; and
d) activating the at least one debit card if approval is obtained.

19. A method for distributing prepaid cards according to claim 18, further comprising the step of facilitating fund transfers between the proxy card and the at least one debit card.

20. A method for distributing prepaid cards according to claim 18, further comprising the step of receiving cash from a customer at the point of sale for the value of funds to be loaded onto the proxy card.

21. A method for distributing prepaid cards according to claim 20, further comprising the step of performing a retail approval process at the point of sale to determine whether the proxy card may be provided to the customer.

22. A method for distributing prepaid cards according to claim 21, further comprising the step of providing the customer with the proxy card and a receipt if retail approval is obtained.

23. A method for distributing prepaid cards according to claim 21, further comprising the step of providing a refund to the customer if retail approval is declined.

24. A method for distributing prepaid cards according to claim 18, wherein the registration process for obtaining compliance for the at least one debit card is performed by a customer.

25. A method for distributing prepaid cards according to claim 24, wherein the registration process for obtaining compliance for the at least one debit card is performed by a customer via the Internet.

26. A method for distributing prepaid cards according to claim 24, wherein the registration process for obtaining compliance for the at least one debit card is performed by a customer via telephone.

27. A method for distributing prepaid cards according to claim 24, wherein the registration process for obtaining compliance for the at least one debit card is performed by a customer at a kiosk.

28. A method for distributing prepaid cards according to claim 27, wherein the funds for the proxy card are loaded into a bill acceptor associated with the kiosk.

29. A method for distributing prepaid cards according to claim 27, wherein the funds for the proxy card are transferred from a consumer credit card at the kiosk.

30. A method for distributing prepaid cards according to claim 18, wherein the at least one debit card is provided to the customer at the point of sale after the customer has obtained compliance.

31. A method for distributing prepaid cards according to claim 18, wherein the at least one debit card is provided to the customer after the customer has obtained compliance at a location remote from the point of sale.

32. A method for distributing prepaid cards according to claim 18, wherein the customer receives a replica of the at least one debit card together with the proxy card at the point of sale.

* * * * *